No. 628,406. Patented July 4, 1899.
H. D. GRISWOLD.
SPROCKET WHEEL CHAIN CASE.
(Application filed July 8, 1897. Renewed June 3, 1899.)
(No Model.)
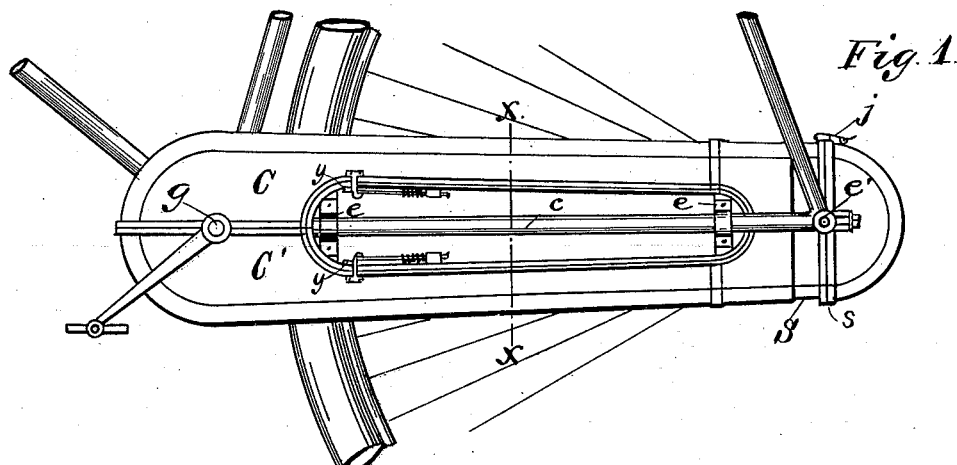
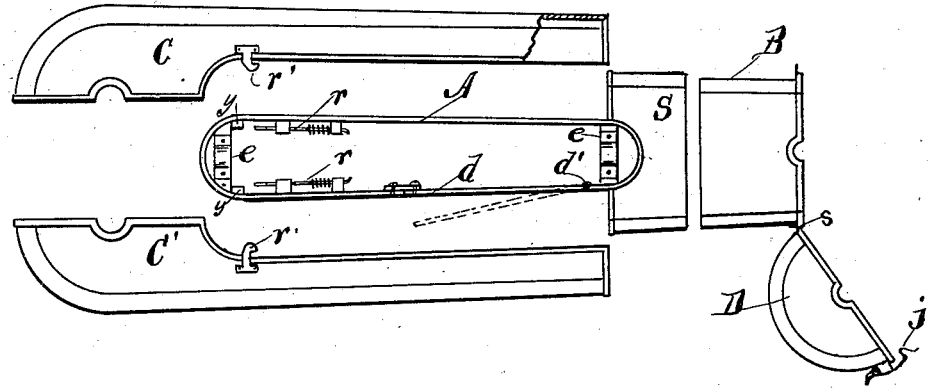
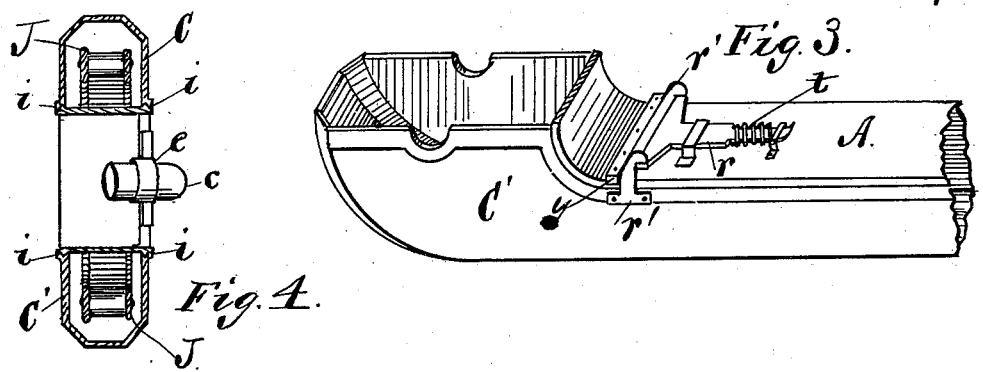
WITNESSES
R. V. Pearce
John P. Smith
INVENTOR
Henry D. Griswold
BY
Arnold & Barlow.
ATTORNEYS.

UNITED STATES PATENT OFFICE.

HENRY D. GRISWOLD, OF OLNEYVILLE, RHODE ISLAND.

SPROCKET-WHEEL-CHAIN CASE.

SPECIFICATION forming part of Letters Patent No. 628,406, dated July 4, 1899.

Application filed July 8, 1897. Renewed June 3, 1899. Serial No. 719,305. (No model.)

*To all whom it may concern:*

Be it known that I, HENRY D. GRISWOLD, of Olneyville, in the county of Providence and State of Rhode Island, have invented certain new and useful Improvements in Sprocket Wheel and Chain Cases for Bicycles; and I do hereby declare that the following is a full, clear, and exact description thereof, reference being had to the accompanying drawings, and to the letters of reference marked thereon, which form a part of this specification.

This invention relates to the cases made to cover the sprocket wheels and chains of bicycles to protect them and keep out the dust. It is fully explained and illustrated in this specification and the accompanying drawings.

Figure 1 represents the case in elevation attached to the bicycle, part only of which is shown in the figure. Fig. 2 shows the parts of the case separated. Fig. 3 is an enlarged perspective view of a part of one division and of the middle part, showing the fastening device. Fig. 4 shows a cross-section of the case on line $x\,x$, Fig. 1, enlarged.

The object of this invention is to make a case to cover the sprocket wheels and chain of the bicycle that shall be dust-proof and that can be readily opened to allow of access to those parts when necessary for oiling, cleaning, or other purposes.

It consists of a hollow case A, through which the lower bar $c$ of the bicycle-frame passes and to which it is fastened by clips $e\,e$. A part $d$ of this case is hinged at $d'$ to allow it to drop and admit the bar $c$ when the case is put on in place for use. The end S of this inner part A is enlarged vertically to a little more than the diameter of the rear sprocket-wheel to receive a sliding case B, which is divided vertically through the openings made in its sides for the axle $e'$ of the rear wheel. The part outside the division is hinged to the sliding case at $s$ and forms a cap D, which can be opened to allow access to the sprocket-wheel. The object of the sliding case is to allow the rear axle and sprocket-wheel to be drawn back to take up the stretch in the chain from use.

The rear part of the case is divided horizontally through the apparatus made for the shaft $g$ of the front sprocket-wheel into an upper part C and a lower part C', which are fitted to slide onto the middle part A, and sliding latches $r\,r$ (see Fig. 3) are held to slide in brackets on the inside of the middle part A and catch in hooked parts $r'$, fast on each outer side of the upper and lower part C and C', and a spring $t$ on each latch pushes it into the catch $r$, and a bar $y$ on the part A pushes the parts C C' tightly into place by the catches $r'\,r'$. The edges of the inner part A where it joins the parts C and C' are made in inverted-V-shaped ridges (seen at $i\,i$ in Fig. 4) and the contacting of the parts C C' is made with a shaped hollow that fits on the ridges close enough to be dust-proof. The joints of the cap D and case B and the joint between the parts C and C' are made in the same way to exclude the dust and dampness as much as possible from the working parts of the machine.

It will readily be seen that by releasing the catch $j$, that holds the cap D up close to the sliding case B, the cap can be turned down to give access to the rear sprocket-wheel, and by sliding back the latches $r\,r$ the upper part C and lower part C' can be taken off of the part A, so as to open the chain J and front sprocket-wheel up to inspection, &c.

Having thus described my improvement, I claim as my invention and desire to secure by Letters Patent—

1. A case for the sprocket wheels and chain of a bicycle, consisting of the following parts, a center hollow case and clips attached thereto to fasten to the frame, a sliding case fitting into one end of said center case, a cap hinged to said sliding case, an upper and a lower part fitted to said center case arranged to cover the front sprocket wheel and chain, and having an aperture at the junction of the two parts for the axle of the front sprocket-wheel, with means for securing said parts together, substantially as described.

2. In a case for the sprocket wheels and chain of the kind described, means for securing the parts together, consisting of sliding T-shaped latches held in brackets on the center part and having spiral springs on them, hook-catches secured to the upper and lower parts of the case, to receive said latches a bar secured to said center case arranged to shut in back of said catches and force the upper and lower parts onto the center case, substantially as described.

In testimony whereof I have hereunto set my hand this 3d day of July, A. D. 1897.

HENRY D. GRISWOLD.

In presence of—
   HOWARD E. BARLOW,
   M. E. LAWTON.